UNITED STATES PATENT OFFICE.

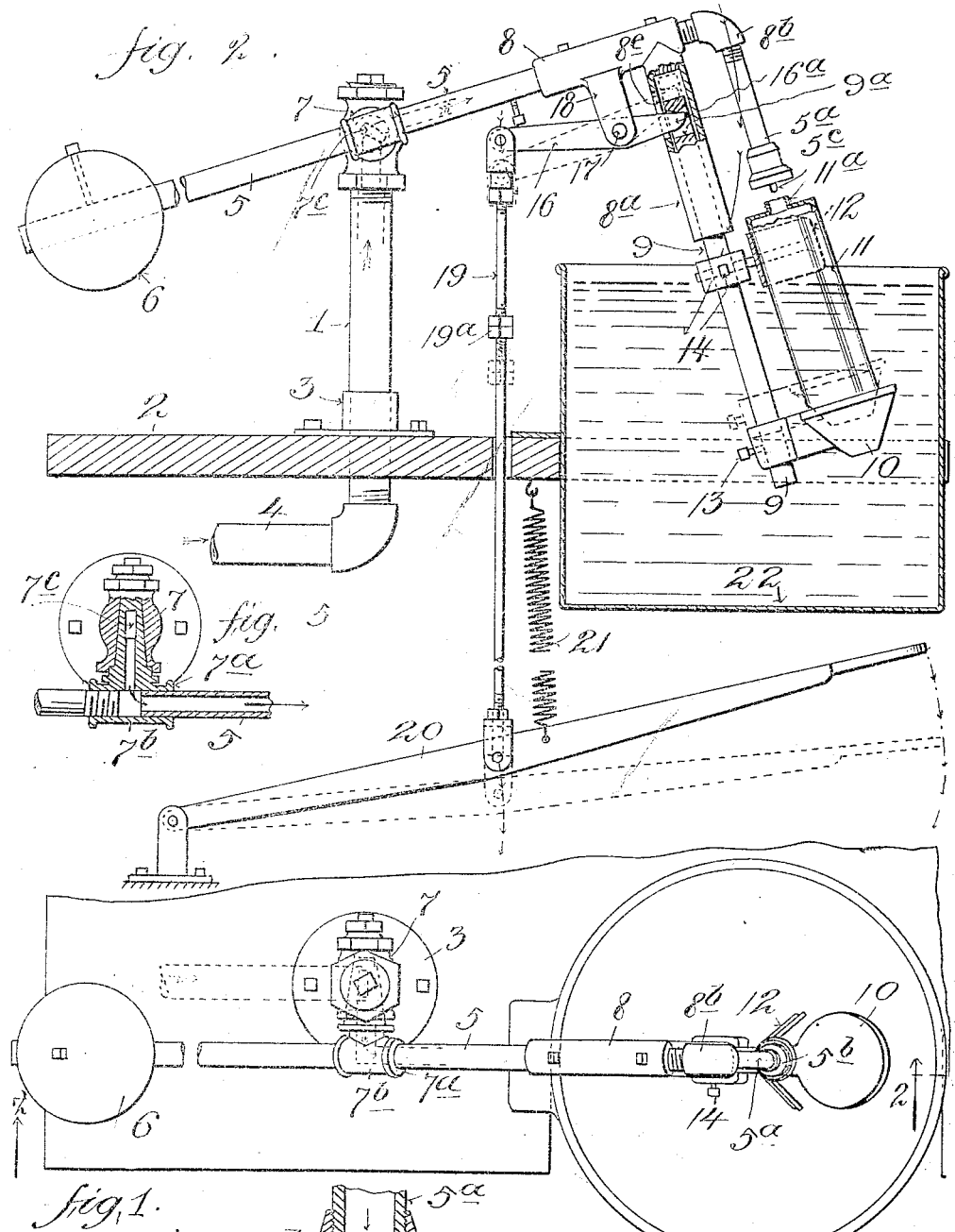

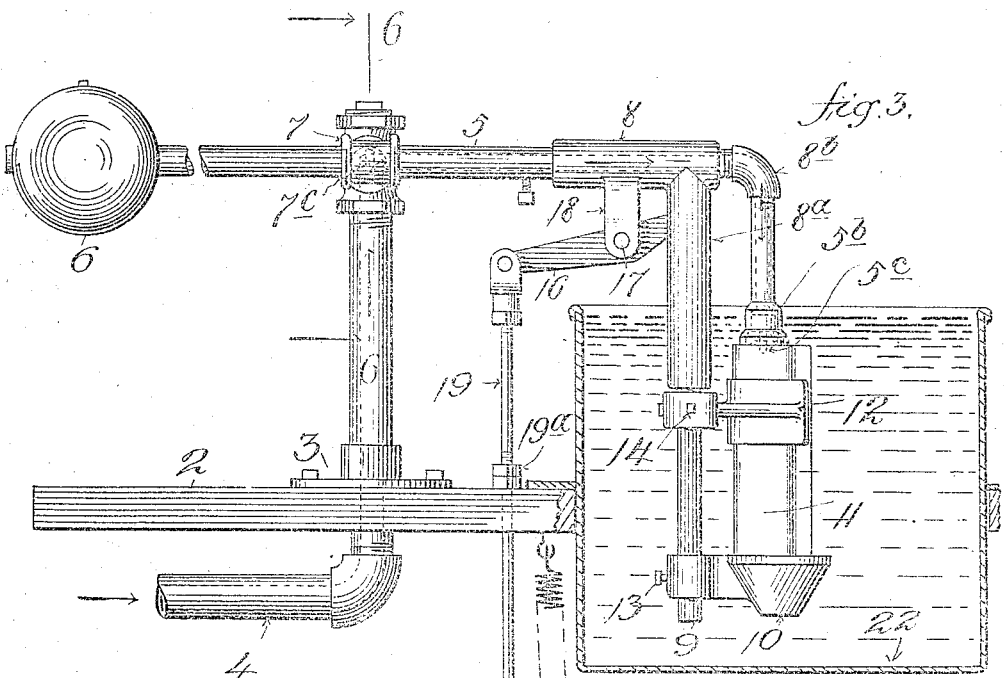

MORRIS KARP, OF PASSAIC, NEW JERSEY, ASSIGNOR TO PASSAIC METAL WARE COMPANY, OF PASSAIC, NEW JERSEY, A CORPORATION OF NEW JERSEY.

MACHINE FOR TESTING CONTAINERS.

1,042,558.  Specification of Letters Patent.  Patented Oct. 29, 1912.

Application filed April 2, 1912. Serial No. 688,020.

*To all whom it may concern:*

Be it known that I, MORRIS KARP, a citizen of the United States, and resident of Passaic, in the county of Passaic and State of New Jersey, have invented certain new and useful Improvements in Machines for Testing Containers, of which the following is a specification.

The object of my invention is to provide simple and efficient means for testing containers, such as cans and the like, under pneumatic pressure while immersed in water, whereby if the containers leak the air bubbles coming through the water would indicate that fact.

My invention is particularly applicable to testing tin cans after the tops and bottoms have been soldered upon the same to ascertain if the cans have been properly soldered to prevent leakage.

My invention comprises novel details of improvement and combinations of parts that will be more fully hereinafter set forth and then pointed out in the claims.

Reference is to be had to the accompanying drawings forming part hereof, wherein, Figure 1 is a plan view of a machine embodying my invention; Fig. 2 is a partly sectional side view, substantially on the plane of the line 2, 2, in Fig. 1, illustrating the parts in position to receive a can for testing; Fig. 3 is a substantially similar view, illustrating the can immersed in a bath; Fig. 4 is an enlarged detail sectional view of the pneumatic head to be applied to the can opening; Fig. 5 is a sectional detail view of the air controlling valve, and Fig. 6 is a view of the same enlarged, taken on the plane of the line 6, 6, in Fig. 3.

Similar numerals of reference indicate corresponding parts in the several views.

At 1 is indicated a pipe or hollow support, which may be secured upon a table or the like 2, as upon the flanged bushing or coupling 3, which pipe communicates with any suitable source of air pressure, as by the piping 4. At 5 is a rocker, shown in the form of a pipe or tube, and suitably extended and provided with a weight 6. Pipe 5 communicates with a valve 7 of any suitable construction fitted upon pipe 1. Pipe 5 is shown fitted to the stem $7^a$ of valve 7 by means of the hollow coupling $7^b$, the port $7^c$ of the valve stem being so arranged as to close the passage to pipe 5 when the latter is raised, as in the position shown in Fig. 2, and to open said passage when pipe 5 is lowered, as to the position shown in Fig. 3, and thereupon permit air to flow through said pipe. Pipe 5 is shown provided with a head 8 having a guide $8^a$ receiving a sliding stem 9 which is provided near its lower end with a rest 10 for a container 11. Rod 9 also carries a fork or seat 12 against which the can body is placed when upon rest 10. The rest 10 may be adjusted along rod 9 by means of a screw 13, and the seat 12 may likewise be adjusted along rod 9 by a screw 14 to accommodate cans of different lengths. Head 8 has a pipe extension $5^a$ shown provided with a head $5^b$ having a suitable nozzle $5^c$ adapted to enter an opening $11^a$ in can 11. Nozzle $5^c$ may be formed on a disk $5^b$ screwed into the threaded end of head $5^b$, and suitable packing 15 may be provided adjacent said nozzle to engage the end of the can (see Fig. 4). The rod is to be operated to hold and release the cans when the same are to be charged with air under pressure. For this purpose I have shown a lever 16, pivotally supported at 17 upon an extension 18 from head 8, the end $16^a$ of said lever entering guide $8^a$ through a slot $8^e$ therein and engaging in a slot or recess $9^a$ in rod 9. Lever 16 is shown connected by a rod 19 with a treadle 20 normally pressed upwardly by spring 21 shown connected with said treadle and with table 2. A stop $19^a$ on rod 19 by engaging table 2 serves to limit the downward movement of the above described parts.

Beneath head 8 and rod 9 is a suitable tank or receptacle 22 shown supported by table 2 and adapted to receive water or other suitable fluid. With the parts in the position shown in Fig. 2, the can or container 11 may be placed by the operator upon rest 10 and against seat 12 and then the treadle is depressed, pulling down rod 19 and rocking lever 16, whereupon rod 9 is raised and the can opening or neck $11^b$ is pressed against washer 15, and nozzle $5^c$ enters the can, forming a substantially air tight fit. A further downward movement of the treadle causes the parts to bind together in such manner that the can and head 5 are caused to be immersed in the water in tank 22, the pipe 5 thereupon rocking to such lowered position, and valve stem $7^a$ is thus turned in such position that air will flow from pipe 1 through the valve (Figs. 3 and 6) and through pipes 5 and 5ª into the can, whereupon if the can has not been tightly soldered air will leak from the can into the water, and the bubbles rising through the water will disclose that fact. When the treadle is released the parts return to their normal positions (Fig. 2) shutting off the air supply and releasing the can, and so on for further testing of cans.

It will be understood that my invention is applicable to testing hollow bodies or articles other than tin cans, and whether the parts are soldered together or secured together by other means, or are formed integral. Also that changes may be made in the arrangements of parts set forth, within the scope of the appended claims, without departing from the spirit of my invention.

Having now described my invention what I claim is:—

1. The combination of a tubular support provided with an air outlet, means connected with said support to clamp a container against said outlet, and simultaneously depress the support and container and a valve connected with said support to permit the flow of air therethrough to the container when in one position and prevent the flow of air therethrough when in another position.

2. The combination of a hollow pivoted support provided with a head having an air outlet, means connected with said support to clamp a container against said outlet, a valve to communicate with said hollow support to control the flow of air through said support as the latter rocks, an operating member, and means connecting said member with said clamping means to simultaneously operate the latter and depress said support thereby.

3. The combination of a valve having a rocking stem, a pipe connected with said stem to receive compressed fluid therefrom and provided with a head having an outlet, container clamping means carried by said pipe to clamp a container against said head, and means for operating said clamping means and rocking said pipe simultaneously.

4. The combination of a pipe having a head provided with an air outlet, means to control the flow of air through said pipe, a rest for a container movably carried by said pipe to clamp the container against said head, and means to raise said rest toward said head and simultaneously rock the same and the pipe downwardly.

5. The combination of a valve having a stem, a pipe connected with said stem, a head connected with said pipe and having an air outlet, a guide carried by said pipe, a rod carried by said guide, said rod having means for holding a container against said head, a lever carried by said pipe and operatively connected with said rod, and means to operate said lever to raise the container against the head and depress the same.

6. The combination of a valve having a stem, a pipe connected with said stem and having a head provided with an air outlet, a rod carried by the pipe container supporting means carried by said rod in line with said head, a lever carried by said pipe and operatively connected with said rod, and means for operating said lever to clamp a container against said head and depress the same and said pipe.

7. The combination of a valve having a stem, a pipe connected with said stem and having a head provided with an air outlet, a rod carried by said pipe container-supporting means carried by said rod in line with said head, a lever carried by said pipe and operatively connected with said rod, and means for operating said lever to clamp a container against said head and depress the same and said pipe, and a tank beneath said head adapted to receive said container.

8. The combination of a valve having a rocking stem, a pipe connected with said stem, a head connected with said pipe and provided with an air outlet, a guide carried by said pipe, a rod carried by said guide and having container clamping means beneath said head, a lever carried by said pipe and operatively connected with said rod, a treadle connected with said lever, and a tank beneath said head and clamping means adapted to receive said container.

9. The combination of a valve having a rocking stem, a pipe connected with said stem, a head connected with said pipe and provided with an air outlet, a guide carried by said pipe, a rod carried by said guide and having container clamping means beneath said head, a lever carried by said pipe and operatively connected with said rod, said guide having a head, said head having a recess, a lever entering said head and recess and carried by said pipe, a treadle connected with said lever, and a tank beneath said head and clamping means adapted to receive said container.

Signed at Passaic, in the county of Passaic, and State of New Jersey, this twenty first day of March A. D. 1912.

MORRIS KARP.

Witnesses:
W. F. GASTON,
FRED W. GASTON.